Dec. 8, 1953
G. E. BULLOCK
2,661,587
FRUIT PICKING APPARATUS
Filed Jan. 3, 1952
2 Sheets-Sheet 1
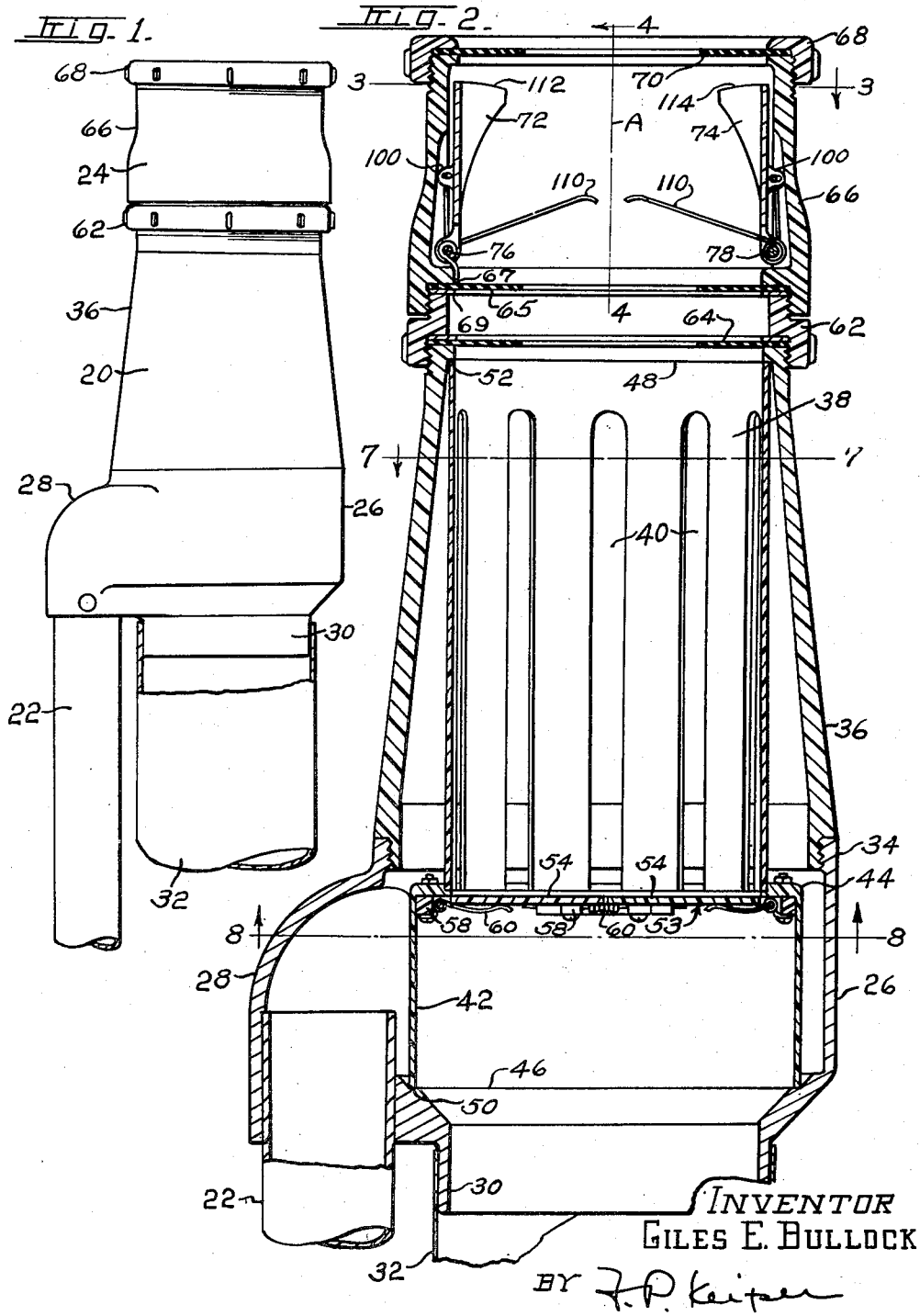
INVENTOR
GILES E. BULLOCK
BY ~~~~
ATTORNEY

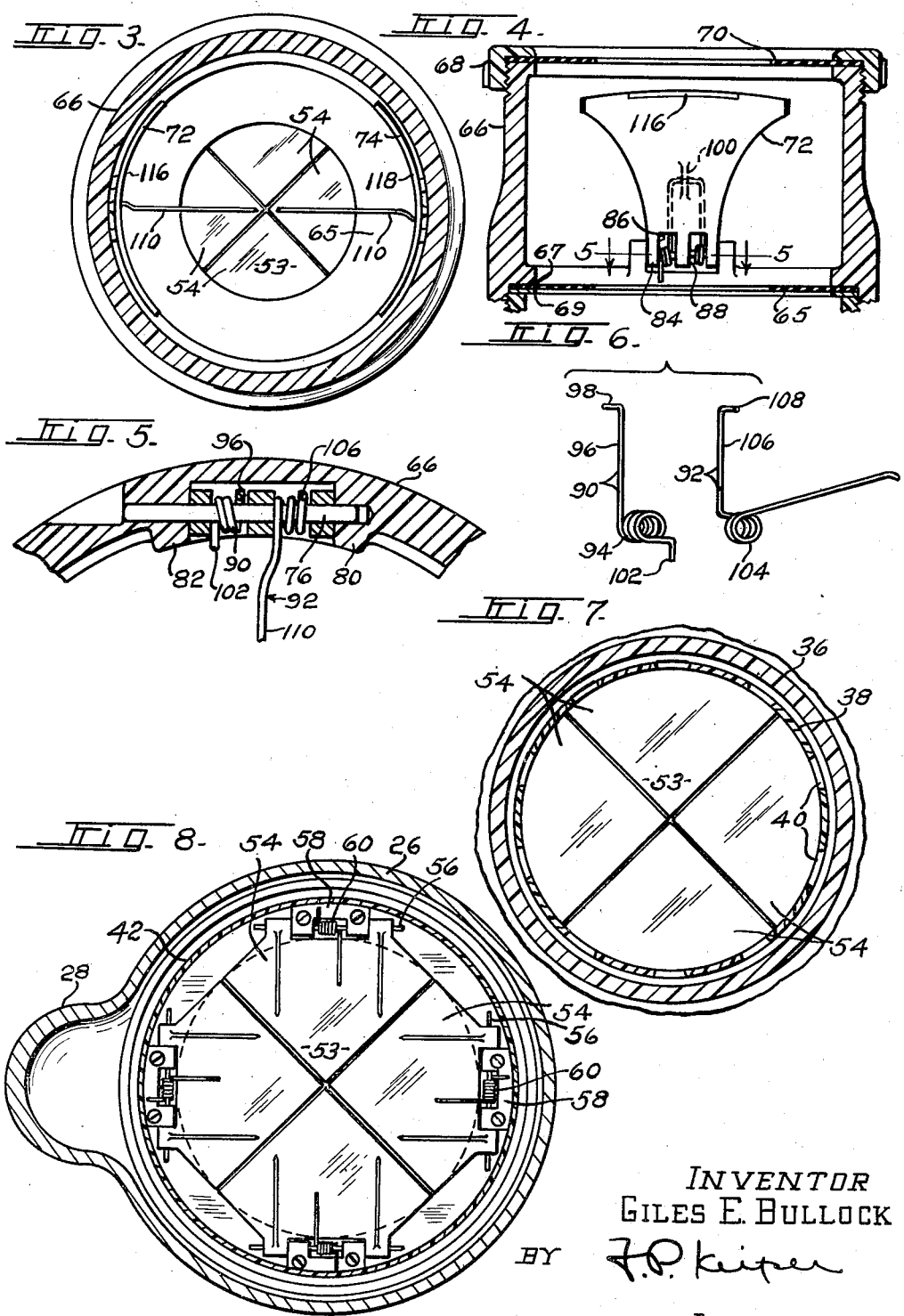

Patented Dec. 8, 1953

2,661,587

UNITED STATES PATENT OFFICE 2,661,587

FRUIT PICKING APPARATUS

Giles E. Bullock, Rochester, N. Y.

Application January 3, 1952, Serial No. 264,766

12 Claims. (Cl. 56—334)

This invention relates to fruit picking apparatus, and more particularly to vacuum actuated apparatus and improvements therein having to do with stem cutting, gripping and valving.

In an application Serial No. 235,689, filed July 9, 1951, there is disclosed a vacuum actuated fruit picking head in which fruit such as apples, peaches, oranges, and the like, are adapted to be received in an open end of a portable tubular vacuum picking head so as to substantially close the end thereof, resulting in atmospheric pressure exerting a picking force tending to propel the fruit into the head. In the arrangement shown, the lower portion of the head is provided with a flap valve, adapted to open upon engagement of picked fruit therewith, to permit the passage of such fruit into a conveyor tube.

The present invention is directed to improvements in the construction and arrangement of a device of the type referred to whereby severance of the fruit from the stem is effected by stem gripping and cutting, while the fruit is in effective sealing or constricting relation with the end of the vacuum chamber and thereby subject to maximum atmospheric picking pressure. Such gripping and cutting is effected through jaws closed by movement of the fruit into the head, with final gripping and cutting derived by toggle action from vacuum pull upon the fruit.

The invention is further directed to improvements in the construction of the head and lower valve, resulting in lightness and ease of manufacture and assembly.

In the drawings, wherein like reference characters indicate like parts:

Figure 1 is a side elevation with parts broken away of the fruit picking head;

Figure 2 is an enlarged central vertical sectional view through the picking head showing the stem gripping and cutting extension;

Figure 3 is a transverse section taken substantially on the line 3—3 of Figure 2;

Figure 4 is a longitudinal section taken substantially on the line 4—4 of Figure 2;

Figure 5 is an enlarged fragmentary sectional view through the hinge pin of a gripper, taken substantially on the line 5—5 of Figure 4;

Figure 6 is a perspective view of the biasing and operating springs applied to each gripper;

Figure 7 is a transverse sectional view with parts broken away taken substantially on the line 7—7 of Figure 2, showing the lower valve; and Figure 8 is a transverse sectional view taken substantially on the line 8—8 of Figure 2, showing the lower valve and hinge construction.

In Figure 1, there is shown a fruit picking head 20 mounted on a support tube 22, the head having a stem gripping and cutting extension 24 arranged on the upper end thereof. Referring also to Figure 2, the head comprises an annular base member 26 having an integral offset enlarged nose piece 28 in which the support tube 22 is detachably received, a depending cylindrical collar 30 to which may be attached a delivery conduit 32 and an internally threaded upper rim 34 in which is threadedly mounted a tapered jacket 36.

Positioned within the base member 26 and the jacket 36 is a sleeve and valve assembly comprising a sleeve 38 having a plurality of longitudinal openings 40 extending substantially along the entire length thereof and a cylindrical outwardly offset skirt 42. The skirt and sleeve are joined together through an inwardly extending annular flange 44 formed as a part of the skirt, the inner marginal edge being annularly rabbeted to form a seat for the end of the sleeve 38. The sleeve 38 and skirt 42 are held in position within the base 26 and jacket 36 by engagement of the opposite ends 46 and 48 of the skirt and sleeve, respectively, with annular shoulders 50 and 52 formed in the base 26 and jacket 36, respectively.

The annular flange 44 is provided on its under side with a valve 53 comprising a plurality of segments 54, each hinged on a hinge pin 56 to hinge blocks 58 secured to the under side of the flange 44. Each segment is held closed by a light torsion spring 60 having its helical turns threaded on the respective hinge pin 56. The free ends of each spring bear against its respective block 58 and valve segment 54 to urge such valve segment to closed position. The under surface of the annular flange engages each valve segment to establish the closed position of the segments, and to afford adequate support to such segments when in closed position and subjected to vacuum within the jacket 36.

At the upper end of the jacket 36 there is threaded an offset ring 62 adapted to clamp upon the upper end of the jacket 36 a resilient annular ring 64 formed of rubber or rubber-like material. Spaced upwardly above the ring 64 is a second similar ring 65 clamped against the upper end of the offset ring 62 by the stem cutting or gripping extension sleeve 66 threaded thereon. The sleeve 66 has at its upper end a threaded ring 68 adapted to clamp a third annular resilient ring 70 against the upper end of the extension sleeve 66.

The structure thus shown is adapted to pick fruit in the manner referred to in the prior application. A source of vacuum is supplied to the tube 22, and when a fruit is positioned within the annular ring 70 (the valve 53 being closed), the upper end of the picking head is momentarily sealed by the fruit. There is thus created a drop in pressure within the picking head, so as to strain the fruit against its stem to effect picking thereof. As soon as the fruit is plucked, it is free to move into the chamber formed by the sleeve 38. As the fruit passes the elongated openings 40, the reduced pressure within the head created by the initial sealing effect of the fruit, is relieved and the movement of the fruit is retarded. The suction which would otherwise tend to hold the valve segments 54 closed is relieved, and the fruit, by its inertia, drops through the valve 53 into the delivery conduit 32.

It will be understood that fruit for shipment to distant markets is picked prior to ripening, and as a result, the stem of such fruit often offers greater resistance to release of the fruit, causing shaking of the supporting limb or even breakage of a supporting twig instead of the stem. Such shaking may tend to loosen other fruit which may be in a riper state, causing such fruit to drop to the ground, resulting in the bruising of such fruit and the rendering thereof generally unfit for the market. Twigs entering the head may interfere with the valve operation. In order to minimize the tendency of the fruit to unduly shake its supporting limb upon being drawn into the picking head, or from breaking off a twig, means are provided for gripping the stem of the fruit as soon as the fruit has commenced to enter the sleeve 38 of the picking head. For this purpose, there is provided a pair of opposed hinged jaw members 72 and 74, such jaw members being hinged on substantially tangentially arranged pintles 76 and 78, positioned in apertured bosses 80 and 82 internally disposed on opposite sides in the lower end of the extension sleeve 66. Each jaw comprises a knuckle portion 84 through which the pintle extends, which knuckle portion is divided to provide recesses 86 and 88 to receive the helical coils of spring members associated with each jaw.

In Figure 6, there is shown a pair of spring members 90 and 92, such as are associated with each jaw, the spring member 90 being adapted to resiliently hold its jaw in open position, and the spring member 92 being adapted by engagement with a fruit entering the head to swing its jaw toward the center of the fruit passage. The springs 90 have a plurality of coils 94 adapted to be threaded upon the respective pintle 76 or 78 in the recess 86 of each jaw, and an arm 96 having a bent end 98 adapted for insertion into an apertured ear 100 on the back side of each of the jaws 72 and 74. The opposite ends 102 of the springs 90 extend downward and bear against the internal lower wall of the extension sleeve 66. The coils 94 are so tensioned as to urge each of the jaws normally toward open position, as shown, for example, in Figure 2. The springs 92 are provided with coils 104 adapted to be threaded upon the respective pintles 76 or 78 within the recess 88 of each jaw. One end of each spring has an extension 106 with a bent end 108 adapted to be inserted in the apertured boss 100 from the opposite direction from the end 98 of the spring 90. The other end of each of the springs 92 extends from the coils 104 toward the center of the extension sleeve 66, as is shown at 110. Both the springs 90 and 92 are made of relatively light resilient spring wire, but the spring 92 is provided with fewer coils 104 than spring 90, or heavier stock, so as to be adapted to overcome the effect of the spring 90 when the ends 110 are engaged by a fruit passing downwardly through the extension sleeve 66.

It will be seen that as a fruit is drawn into the extension sleeve 66 through the resilient ring 70, such fruit will engage the ends 110 of the springs 92 and will tend to swing the jaws 72 and 74 toward one another until the edges 112 and 114 of the jaws substantially meet on the center plane A, where such edges will grip the stem of a fruit partially drawn into the sleeve 38. The edges 112 and 114 at their center section may be provided with sharpened cutting or shearing edges as at 116 and 118, so that upon atmospheric pressure tending to drive the fruit into the sleeve 38, the jaws 72 and 74 will tend to grip the stem with substantial force by reason of the toggle effect, and the cutting edges 116 and 118 will sever the stem, whereupon the fruit is released to proceed into the sleeve 38. In the event that it is desired to sever the fruit from the stem at the juncture between stem and fruit without cutting the stem, it will be apparent that the jaws 112 and 114 may be provided with serrations instead of cutting edges so as to grip the stem without cutting action, whereupon the substantial pull upon the fruit will separate the fruit from the stem where it joins the fruit. The spring ends 110 serve as operating means for initially bringing the jaws together upon the stem, after which the pull of the fruit causes the jaws to bear tightly against the stem, effecting the gripping or cutting action referred to. Effective toggle action results when the jaws are of such length as to meet while at an angle approximately 15° from a transverse plane.

As soon as the fruit has been released for passage downwardly into the sleeve 38 by cutting or breaking away from the stem, tension upon the portion of the stem gripped by the jaws is released. The fruit passes beyond the operating ends 110 of the springs 92, and the jaws are thereupon free to reopen to the position shown, for example, in Figure 2. Each of the jaws 72 and 74 are curved, so as to nest within the internal circular wall of the extension sleeve 66, and the gripping ends 112 and 114 are so curved as to engage on a common center dividing plane indicated at A along substantially their entire length when the jaws are closed in gripping or cutting relation upon the stem of a fruit. Each of the spaced rings 64, 65 and 70 may have a center aperture small enough to be closed by the smaller fruit to be picked, and are of such resiliency as to be readily distended by larger fruit. When such rings act as a seal during passage of fruit therethrough, the maximum pulling and gripping effect results. Whether the aperture be sealed or merely constricted, however, has little effect upon the effectiveness of the jaws in facilitating the severance of fruit. Such resilient rings are supported between shoulders and washers such as 67 and 69, respectively, to afford proper support for the outer marginal edges.

The spaced resilient rings 64 and 65 are adapted to provide an extended axial region in which the fruit acts as a seal or restriction in the upper end of the picking head, so that regardless of the size of the fruit or at what point the jaws 72 and 74 grip the stem of the fruit, the fruit will still be in a position to seal either one of the rings 64 or 65 to create and maintain a vacuum within the head, so that atmospheric pressure will bear upon the fruit with maximum effect. Thus, the stem of the fruit, while being gripped between the jaws 72 and 74, will be urged downward with substantial force to assure a solid grip of the jaws through the toggle action. At the same time, the vacuum pressure will act to break the fruit away from the rigidly held stem with maximum effect. If the jaws be provided with shearing or cutting edges, the downward pull on the fruit when its stem is caught between such edges will effect the closing of such cutting edges with substantial force, assuring effective stem cutting action.

It will thus be seen that as a fruit is drawn into the picking head, the jaws are promptly caused to grip or cut the fruit stem, thus limiting the movement of the supporting limb to that occasioned by the initial movement of the fruit into the head. It will be appreciated that were it not for the gripping or cutting action of the jaws 72 and 74, the stem would be drawn further into the head, and instead of the fruit being severed from the stem, a twig or a portion of the branch might be severed with the fruit and introduced into the apparatus. Additionally, the operator, in order to release the fruit from its stem, would likely resort to vigorous lateral or downward movement of the picking head in order to strain the fruit free of its stem. Such vigorous movement would likely break off a twig, instead of severing the stem, or have the effect of causing the other fruit in a ripened state to drop from the limb, thereby preventing the picking of such fruit through the vacuum picking mechanism which affords careful handling of the fruit without damage thereto. It will be understood that failure of an occasional fruit to promptly release itself from its supporting stem results in the disruption of the otherwise fast picking operation afforded by the apparatus. By providing assurance of stem severance, the apparatus is rendered useful in connection with different varieties of fruit, regardless of the stem tenacity characteristics.

The apparatus thus described is adapted to grip the stem of such fruit, while the fruit itself is in constricting or sealing relation to the resilient rings, and thus tension is applied to the fruit stem for severance or cutting under the most favorable conditions of maximum pull on the fruit. The major parts of the apparatus as described may be conveniently formed from light weight materials such as clear plastic, if desired, and the arrangement is such that the parts may be readily disassembled. If desired, the cutting and gripping head may be removed and the apparatus used without such head, the threads in the offset ring 62 and cap 68 being interchangeable.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a fruit picking device, a hollow picking head having a fruit-receiving end, means mounted upon the head adjacent the receiving end for gripping the stem of a fruit to be picked, means within the head responsive to the passage of a fruit into said head for initially causing said gripping means to grip the stem of said fruit, and differential pressure means disposed within said head for pulling said fruit against said gripped stem.

2. In a fruit picking device, a hollow picking head having a fruit-receiving end, means mounted within the head adjacent the receiving end comprising opposed jaws for gripping the stem of a fruit to be picked, means responsive to the passage of a fruit into said head for initially actuating said gripping means into stem gripping relation, and differential pressure means disposed within said head for pulling said fruit against said gripped stem.

3. In a fruit picking device, a hollow picking head having a fruit-receiving end, means mounted within the head adjacent the receiving end comprising opposed jaws for gripping the stem of a fruit, differential pressure means at the receiving end for drawing a fruit into said head, means responsive to the passage of a fruit into said head for causing said gripping means to grip the stem of said fruit, and differential pressure means disposed within said head for exerting a pull on said fruit against said gripped stem.

4. In a fruit picking device, a hollow picking head having a fruit-receiving end, means mounted within the head adjacent the receiving end comprising opposed jaws for gripping the stem of a fruit, differential pressure means at the receiving end for drawing a fruit into said head, means responsive to the passage of a fruit into said head for causing said gripping means to grip the stem of said fruit, differential pressure means disposed within said head for exerting a pull on said fruit against said gripped stem, and means for relieving the pull effect of said last-named differential pressure means upon said fruit upon movement of said fruit following severance from the gripped stem.

5. In a fruit picking device, a hollow cylindrical casing having an open upper end for receiving a fruit, a pair of jaws adapted to nest within the casing, means for pivoting said jaws within the casing on opposite sides and at the lower end of the casing, said jaws being adapted to swing downwardly and converge into engagement with one another on a central plane with respect to said casing and at a point above said pivoting means, means extending toward the center of said casing and carried by said jaws, and adapted upon engagement of a fruit passing through the casing to swing said jaws together into engagement with the stem of said fruit, and means disposed within said casing below said jaws for exerting a downward pull on said fruit after passage through said casing.

6. In a fruit picking device, a hollow cylindrical casing having an open upper end for receiving a fruit, a pair of jaws adapted to nest within the casing, means for pivoting said jaws within the casing on opposite sides and at the lower end of the casing, said jaws being adapted to swing downwardly and converge into engagement with one another on a central plane with respect to said casing and at a point above said pivoting means, means extending toward the center of said casing and carried by said jaws and adapted upon engagement of a fruit passing through the casing to swing said jaws together into engagement with the stem of said fruit, and differential pressure means disposed within said casing below said jaws for drawing said fruit through said casing and exerting a pull on said fruit after engagement of said jaws with the stem of said fruit.

7. In a fruit picking device, a hollow picking head having an open end for receiving a fruit to be picked, means for drawing a fruit into the head, a pair of jaws hinged on opposite sides of and within the head and adapted to converge centrally of the picking head, and means associated with said jaws and responsive to the passage of a fruit into said head for converging said jaws together to grip the supporting stem of such fruit.

8. In a fruit picking device, a hollow picking head having an open end for receiving a fruit to be picked, means for drawing a fruit into the head, a pair of jaws hinged on opposite sides of and within the head and adapted to converge centrally of the picking head, means associated with said jaws and responsive to the passage of a fruit into said head for converging said jaws together to grip the supporting stem of such fruit, and means associated with the jaws and head for normally holding said jaws in open spaced relation within said head.

9. In a fruit picking device, a tubular member having an open end for receiving fruit to be picked, means for drawing a fruit into the open end of said member, a pair of jaws hinged on opposite sides of the member and normally disposed in nesting relation to the internal wall of the tubular member, and adapted to swing to a position with the jaws converging centrally of the tubular member, and means associated with said jaws responsive to the passage of a fruit into said tubular member for converging said jaws together to grip the supporting stem of such fruit.

10. In a fruit picking device, a tubular member having an open end for receiving fruit to be picked, differential pressure means at the open end for drawing a fruit into the open end of said member, a pair of jaws hinged on opposite sides of the member and normally disposed in nesting relation to the internal wall of the tubular member, and adapted to swing to a position with the jaws converging centrally of the tubular member, and means associated with said jaws responsive to the passage of a fruit into said tubular member for converging said jaws together to grip the supporting stem of such fruit, and differential pressure means disposed within said tubular member and below said jaws for exerting a pull on said fruit while said jaws grip said stem to sever the fruit from the stem.

11. In a fruit picking device, a tubular member having an open end for receiving fruit to be picked, differential pressure means at the open end for drawing a fruit into the open end of said member, a pair of arcuate sectioned jaws hinged at their lower ends on opposite sides of the member and normally disposed in nesting relation to the internal wall of the tubular member, and adapted to swing to a position with the jaws converging centrally of the tubular member, said jaws having broad engaging curved faces adapted to lie on a vertical axial plane when converged, and means associated with said jaws responsive to the passage of a fruit into said tubular member for converging said jaws together to grip the supporting stem of such fruit, and differential pressure means disposed within said tubular member and below said jaws for exerting a pull on said fruit while said jaws grip the stem of said fruit to sever the fruit from the stem.

12. In a fruit picking device, a supporting jacket, a perforate sleeve therewithin extending lengthwise thereof defining a passage for fruit, and defining with said jacket an annular surrounding chamber adapted to be connected to a source of vacuum, a normally closed fruit discharge valve at the lower end of said sleeve, an annular resilient orifice ring secured at the upper end of said sleeve adapted to cooperate with a fruit to substantially close the upper end of said sleeve during passage of a fruit therethrough, a stem gripping device mounted immediately above said sleeve comprising a tubular housing forming an extension of said sleeve, a pair of jaws nesting within the housing on opposite sides thereof, means for hinging said jaws at their lower ends upon the housing, said jaws being adapted to swing toward the center of the housing and downward to converge centrally above said orifice, and means associated with said jaws for initially converging said jaws upon the passage of a fruit into said orifice, to grip the supporting stem of such fruit, said jaws being of a length and having curved faces adapted to meet on a vertical central plane above the plane of said hinging means and said ring, whereby differential pressure on a fruit positioned within said ring and having its stem secured between said jaws effects a downward pull on said fruit and a toggle gripping action of the jaws upon said stem.

GILES E. BULLOCK.

References Cited in the file of this patent

UNITED STATES PATENTS

| Number | Name | Date |
|---|---|---|
| 1,241,411 | McNeill | Sept. 25, 1917 |
| 2,288,682 | Chittenden | July 7, 1942 |
| 2,545,072 | Denman | Mar. 13, 1951 |